United States Patent [19]

Nagamori

[11] 3,830,382
[45] Aug. 20, 1974

[54] ARTICLE HANDLING APPARATUS WITH SPRING-ASSISTED PANTAGRAPH RAISING MECHANISM

[75] Inventor: Yoshimasa Nagamori, Toyama, Japan

[73] Assignee: Kabushiki Kaisha Fujikoshi, Ishigane, Toyama-shi, Toyama-ken, Japan

[22] Filed: Nov. 2, 1972

[21] Appl. No.: 303,269

[30] Foreign Application Priority Data
Nov. 6, 1971    Japan.............................. 46-103487

[52] U.S. Cl............................. 214/1 BB, 214/1 BC
[51] Int. Cl.............................................. B66c 1/44
[58] Field of Search... 214/1 BB, 1 BC, 1 BD, 1 BT, 214/1 BH, 1 BV

[56] References Cited
UNITED STATES PATENTS
3,543,947  7/1968  Devol ............................... 214/1 BC
3,655,070  4/1972  Haydu............................... 214/1 BB
3,682,327  8/1972  Winne ............................... 214/1 BC

*Primary Examiner*—Robert J. Spar
*Assistant Examiner*—George F. Abraham
*Attorney, Agent, or Firm*—Flynn & Frishauf

[57] ABSTRACT

An apparatus for handling articles comprises a platform, a mechanism mounted on the platform for handling the articles, a foldable pantagraph for supporting the platform and means to operate the pantagraph for moving the platform in the vertical direction, said handling mechanism being supported preferably and rotatably by the platform. Further provided is a spring which is associated with the pantagraph operating means to assist the same while the pantagraph is being folded.

14 Claims, 10 Drawing Figures

ARTICLE HANDLING APPARATUS WITH SPRING-ASSISTED PANTAGRAPH RAISING MECHANISM

BACKGROUND OF THE INVENTION

This invention relates to an apparatus for handling articles, and more particularly to an industrial robot machine for performing various operations such as transporting, fabricating, painting, welding and the like.

According to the prior art, an industrial robot of the so-called cylindrical coordinate type has a tall vertical post which is used as a combined guide and post for an arm which includes a suitable mechanism for performing a desired operation, for example, grasping an object. The arm is moved in the vertical direction along the post and rotated about the axis of the post by rotating the post about its own axis.

According to another type of prior art industrial robot of the polar coordinate type, when moving an article in the vertical direction it is necessary to correct the angle between the wrist and the arm in a vertical plane which contains the arm and the wrist.

It has already been proposed to incorporate a foldable pantagraph mechanism into an industrial robot, but such a pantagraph mechanism is used to move the robot machine in the vertical direction which is provided with an independent raising and lowering mechanism. In other words, the robot machine is mounted on a table lifter and the pantagraph mechanism is used to adjustably increase the stroke width in the vertical direction of the robot itself. Moreover, the known pantagraph mechanism is defective in that it requires a remarkably larger operating force in the compressed situation than in the expanded situation.

It is therefore an object of this invention to provide an improved apparatus for handling articles which is simple in construction, can be operated with small power and can move the article in the vertical and horizontal directions, rotate and swivel the article.

Another object of this invention is to provide an improved apparatus for handling articles which is provided with a foldable pantagraph mechanism that can be operated with a small power and hence with a power source of a decreased capacity.

Still another object of this invention is to eliminate the use of conventional sturdy guide post facilitating smaller driving force for rotation and inclination of posts, thereby facilitating an accurate movement of horizontal arms.

Yet another object of this invention is to provide an improved industrial robot machine utilizing a post of small height for supporting an arm which carries a means such as a grasping mechanism, thereby decreasing the overall height of the machine.

A further object of this invention is to provide an improved industrial robot machine which does not require any correction of the vertical angle of the wrist.

A still further object of this invention is to provide an improved apparatus for handling articles wherein the speed of the vertical movement of a platform carrying the article handling mechanism can be readily controlled.

SUMMARY OF THE INVENTION

According to this invention, these and further objects can be accomplished by providing apparatus for handling articles comprising a platform, a mechanism mounted on the platform for handling the articles, a foldable pantagraph for supporting the platform and means to operate the pantagraph for moving the platform in the vertical direction. Further provided is a spring which is associated with the pantagraph operating means to assist the same while the pantagraph is being folded.

Preferably, the mechanism for handling the article comprises a vertical shaft rotatably supported by the platform, a horizontal arm supported by the vertical shaft, and a wrist member mounted on the horizontal arm. Preferably a plurality of fluid pressure actuators are provided for rotating the vertical shaft, for rotating the horizontal arm about its axis, for reciprocating the horizontal arm, for operating the wrist member and for operating the foldable pantagraph. These fluid pressure actuators are controlled by electrical control means in accordance with a prescribed program. A rotary valve is preferably provided for controlling the flow of operating fluid to respective fluid pressure actuators.

DESCRIPTION OF THE PREFERRED EMBODIMENT

The accompanying drawings illustrate a preferred embodiment of an industrial robot machine for handling articles under a programmed control.

Figure 3:
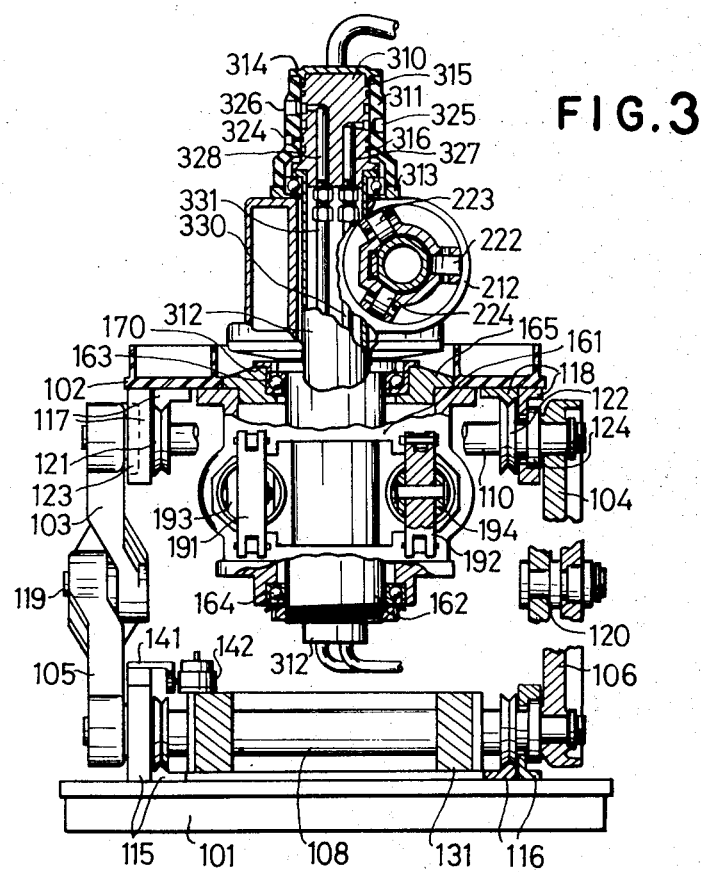
FIG. 3 is an enlarged view of the righthand side of the apparatus shown in FIGS. 1 and 2.

Upon a base 101 are secured a pair of bearing cases 111 and 112 by which the opposite ends of a shaft 107 is rotatably supported by means of bearings mounted in the bearing cases. Cross-bars 103 and 104 are secured to the shaft 107 on the outside of the bearing cases 111 and 112. The cross-bars 103 and 104 are rotatably connected to corresponding cross-bars 105 and 106 by means of pins 119 and 120 extending through longitudinal centers of the cross-bars. Thus, each pair of cross-bars intersect with each other to form a letter X. The opposite ends of the cross-bars 103 and 104 are connected to both ends of a shaft 110 which is supported by slide guides 117 and 118 secured to a horizontal platform 102 through a plurality of rollers 121, 122, 123 and 124. The upper ends of cross-bars 105 and 106 are connected to the opposite ends of a shaft 109 which s rotatably supported by bearing cases 113 and 114 secured to the platform 102. The lower ends of the cross-bars 105 and 106 are secured to the opposite ends of a shaft 108. As shown in FIG. 3 the cross-bars 105 and 106 are guided by slide guides 115 and 116 by means of rollers, the slide guides 115 and 116 being secured to the base 101 on the inner side of the crossbars 105 and 106.

Figure 4:
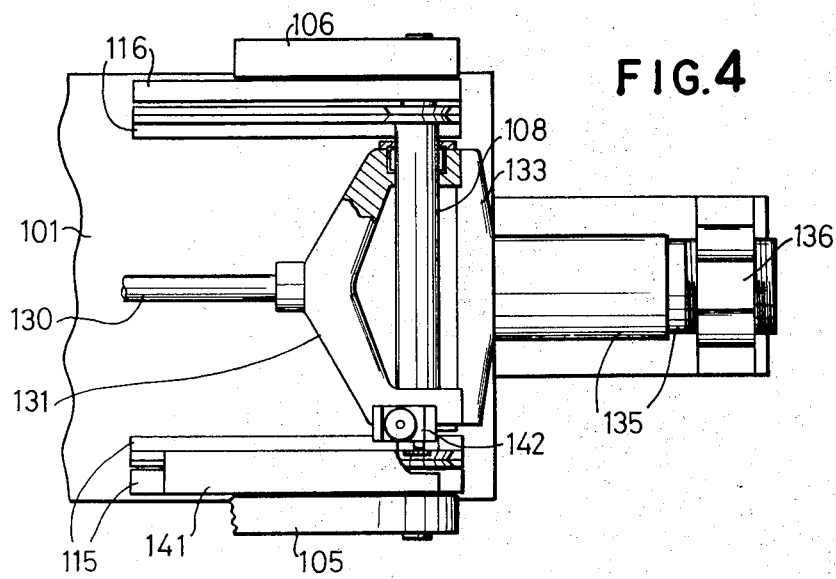
FIG. 4 shows a plan view taken along a line IV — IV shown in FIG. 2.

The base 101 and the platform 103 are parallel with each other and cross-bars 103 and 104 and cross-bars 105 and 106 are parallel with each other. Shafts 107, 108, 109 and 110 are also parallel with each other. Four cross-bars 103, 104, 105 and 106, four shafts 107, 108, 109 and 110 and two pins 119 and 120 cooperate to form a pantagraph mechanism 100. By varying the spacing between two shafts 107 and 108 which are disposed close to the base 101 it is possible to move the platform in the vertical direction. For the purpose of accomplishing this object a fluid pressure actuator or a piston-cylinder assembly 130 is secured to the upper surface of the base 101 by means of brackets 132. A bifurcated arm 131 is secured to the piston rod of the fluid pressure actuator 130, the arm 131 being supported by shaft 108 through bearings, not shown. By reciprocating the piston rod of the fluid pressure actuator 130, the shaft 108 is moved to left and right as viewed in FIG. 2 for moving the platform 102 in the vertical direction. It is well known in the art that a pantagraph mechanism is disadvantageous in that the force applied thereto by the fluid pressure actuator varies with the height or level of the platform. It is an important characteristic of this invention to use a pantagraph mechanism and to eliminate this disadvantage by incorporating thereto an operating spring. More particularly, as shown in FIG. 4, a spring seat 133 is secured to the outer end of the bifurcated arm 131 on the side thereof opposite to the fluid pressure actuator 130. A spring casing 135 is secured to the outer surface of the spring seat 133 in axial alignment with the fluid pressure actuator 130 for containing a coil spring 134. The spring casing 135 is supported by a bracket 136 secured to the base 101.

The coil spring 134 is designed such that it assists the output of the fluid pressure actuator 130 from a point of the maximum stroke of the fluid pressure actuator to an intermediate point of the stroke. More particularly, when the platform 102 is in its lowest position, the fluid pressure actuator is required to generate the largest power to raise the platform 102. However, under these circumstances since the coil spring 134 is compressed to the shortest length, the spring can exert largest force. As the platform 102 rises, the power required for the fluid pressure actuator to raise the platform decreases and the force stored in the coil spring decreases gradually.

Utilization of such an operating spring not only decreases the capacity of the fluid pressure actuator but also decreases the variation in the force to be generated by the fluid pressure actuator thus facilitating the speed control of the vertical motion of the platform. Decrease in the capacity of the fluid pressure actuator means a decrease in the capacity of the source of fluid pressure. Since the ratio of the movements of the frame platform and the fluid pressure actuator 130 is 1 : 1, it is possible to detect the vertical position of the platform 102 by detecting the movement of the arm 131 secured to the piston rod of the fluid pressure actuator. More particularly, as shown in FIGS. 3 and 4, a rack 141 is secured to slide guides 115 for rotating a pinion secured to a shaft of a potentiometer 142. A servo valve 151 (see FIG. 9) or controlling the quantity of the pressurized fluid supplied to the fluid pressure actuator 130 is connected to a manifold (not shown) mounted on the base.

Turning now to a swivel shaft, a main shaft housing 161 is secured to the under side of the platform 102 in front of the centre thereof. A main shaft 162 (FIG. 2) is provided with a flanged surface at its upper portion and an arm holder 210 is secured to the flanged surface for supporting a horizontal arm 200. The main shaft 162 is rotatably supported by a pair of vertically spaced apart bearings 163 and 164 (see FIG. 3). The upper bearing 163 is mounted on the main shaft housing 161 through a bearing holder 165 whereas the lower bearing 164 is supported directly by the main shaft housing 161. A combined gasket and bearing clamp 170 is provided for the upper bearing 163.

A pair of sprocket wheels 181 and 182 are secured to the central portion of the main shaft by means of pins and the sprocket wheels 181 and 182 are meshed with a pair of chains 185 and 186. The opposite ends of the chains 185 and 186 are connected to rods 187, 188, 189 and 190 respectively, which are connected to equalizer beams 191 and 192 (FIG. 3). The mid points of these equalizer beams are connected to the piston rods of a pair of fluid pressure actuators 193 and 194 by means of pins, the midpoints of the cylinders of the fluid pressure actuators 193 and 194 being secured to the main shaft housing 161. The pistons of the fluid pressure actuators 193 and 194 are interconnected by a chain and are reciprocated so as to rotate the main shaft through the chains 185 and 186 and sprocket wheels 181 and 182. Respective fluid pressure actuators 193 and 194 are connected to a servovalve 201 by means of pipe lines as diagrammatically shown in FIG. 9.

The servovalve 201 for controlling the quantity of pressurized fluid to fluid pressure actuators 193 and 194 is connected to a manifold (not shown) mounted on the lower portion of the main shaft housing 161 and is also connected to a P port 412 and a T port 413.

For the purpose of detecting the angular position of the swivel or main shaft, a potentiometer 205 is secured to the lower end of the main shaft housing 161 by means of a bracket 204 (see FIG. 2) and the potentiometer 205 is driven by a pinion secured to the shaft thereof and a spur gear 203 mounted on the lower end of the main shaft.

Figure 5:
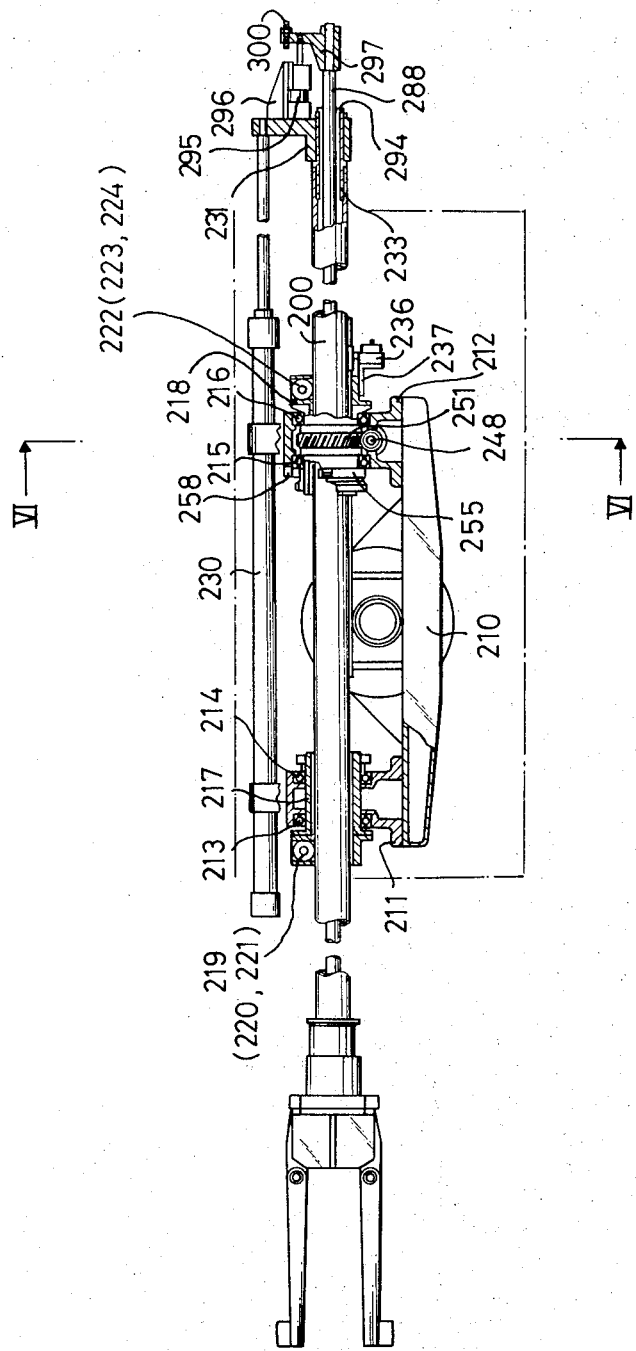
FIG. 5 shows a plan view taken along a line V — V in FIG. 2.

As shown in FIG. 5, the arm holder 210 is secured to the flanged surface on the upper end of the main shaft 162 for holding arm holding brackets 211 and 212. These brackets rotatably support arm supporting sleeves 217 and 218 respectively through pairs of bearings 213, 214, 215 and 216. A horizontal arm 200 extends through arm supporting sleeves 217 and 218. The three circumferentially spaced apart points of the arm 200 are supported by rollers 219 through 224, each provided with a bearing, as shown in FIGS. 3 and 5 so that the arm 200 can reciprocate freely. These rollers are supported by eccentric shafts (not shown) for the purpose of adjusting the gaps between the rollers and the horizontal arm 200. With this construction, the horizontal arm can rotate about its axis together with the arm supporting sleeves.

A horizontal fluid pressure actuator 230 is supported by brackets 211 and 212 as shown in FIG. 5. The outer end of the piston rod of the fluid pressure actuator 230 is connected to a connecting arm 231 by screw threads. The connecting arm 231 is connected to a hollow shaft 233 which is fitted over the horizontal arm 200 through a pair of radial bearings and a pair of thrust bearings and connected to arm 200 by means of a pin so that the horizontal arm 200 can rotate freely irrespective of the position of the piston rod of the horizontal fluid pressure actuator 230. The axes of the horizontal arm 200 and the horizontal fluid pressure actuator 230 are maintained in exact parallel relationship so that the piston rod of the fluid pressure actuator 230 can move in unison ith the horizontal arm 200.

A servovalve 234 for controlling the quantity of the pressurized fluid to the horizontal fluid pressure actuator 230 is connected to a manifold, not shown, which is secured to the arm holder 210. The servovalve 234 is also connected to P port 412 and T port 413.

Figure 1:
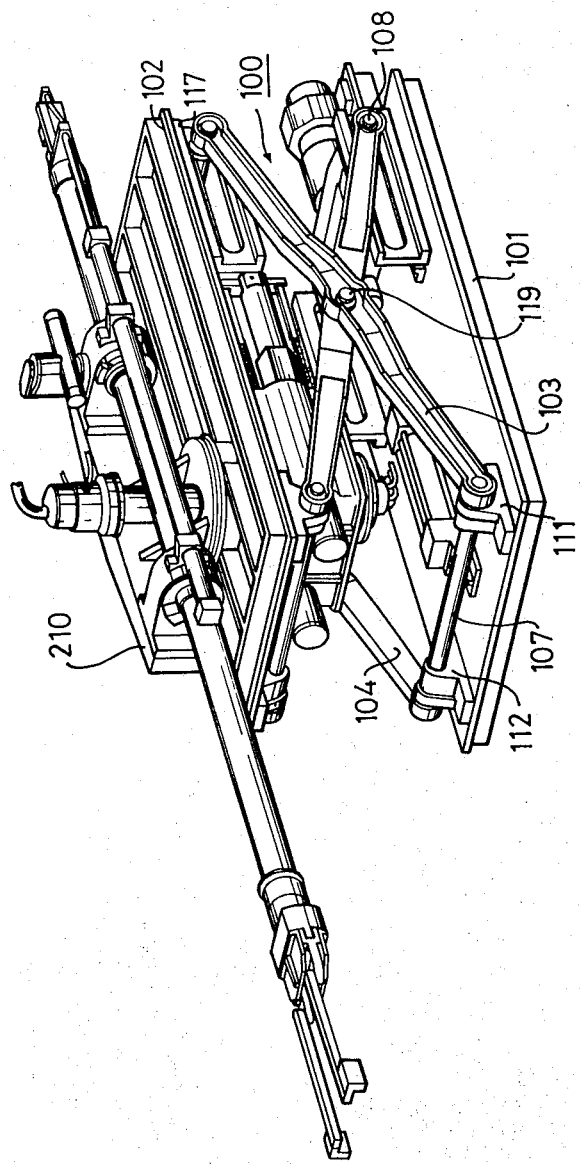
FIG. 1 is a perspective view of the apparatus for handling articles according to this invention.
Figure 2:
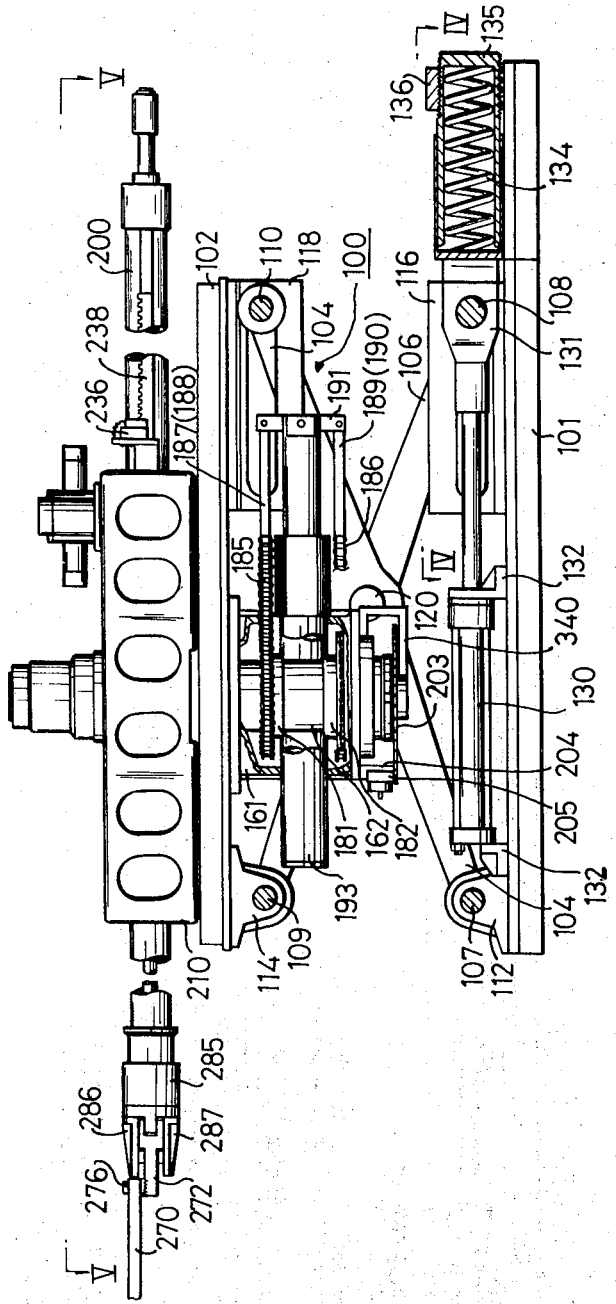
FIG. 2 is a front view of the apparatus shown in FIG. 1.

As shown in FIGS. 2 and 5, the position of the horizontal arm is detected by a potentiometer 236 secured to the arm holder bracket 212 through a stay 237 and driven by a rack 238 secured to the horizontal arm 200 through a pinion secured to the shaft of the potentiometer 236.

Figure 6:
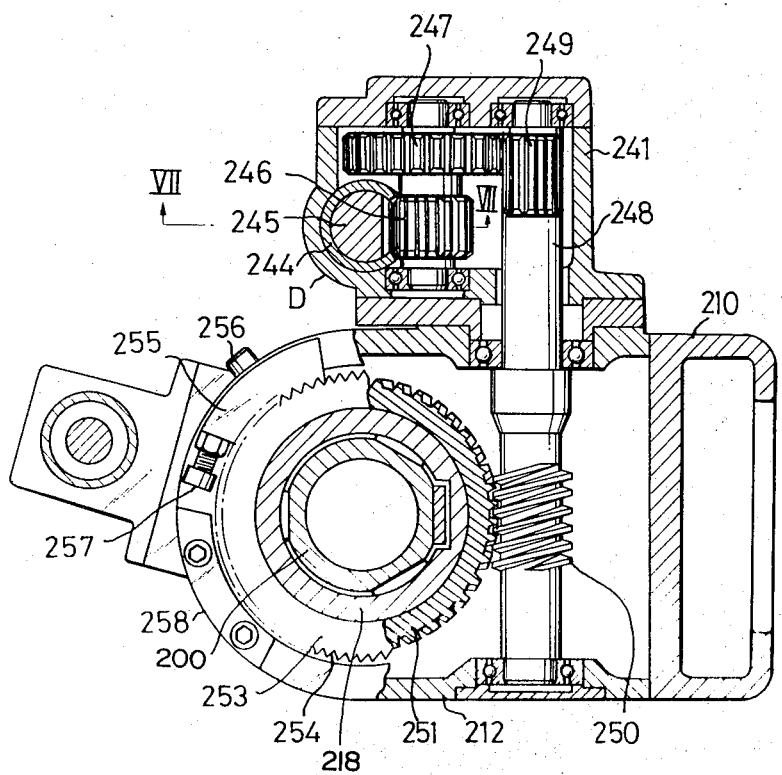
FIG. 6 shows an enlarged sectional view taken along a line VI — VI in FIG. 5.
Figure 7:
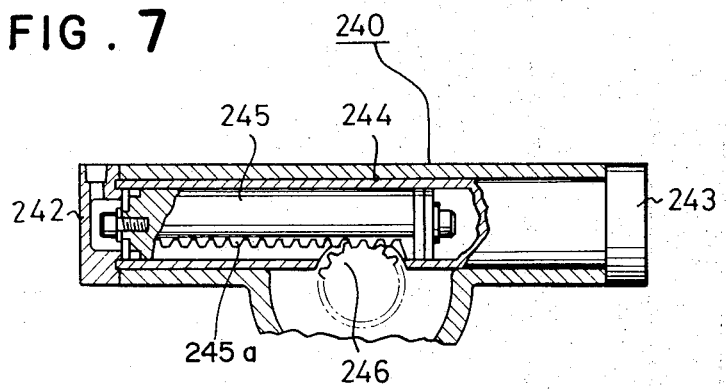
FIG. 7 shows a sectional view taken along a line VII — VII in FIG. 6.

The rotary motion or the twisting motion of the horizontal arm 200 is effected by rotating the arm supporting sleeve 218 which is shown on the righthand side in FIG. 5. A fluid pressure actuator 240 (FIG. 7) for rotating the horizontal arm is secured to a gear box 241 mounted on the arm holder bracket 212. As best shown in FIGS. 6 and 7, the fluid pressure actuator 240 comprises a cylinder 244, with both ends closed by end plates 242 and 243 and a piston 245 provided with a rack 245a and contained in the cylinder 244 to reciprocate.

The rack 245a secured to the piston 245 meshes with a pinion 246 supported by the gear box 241 through a bearing so as to transform the reciprocating motion of the piston 245 into rotary motion. A gear 247 mounted on the same shaft as pinion 246 meshes with a gear 249 integral with a motion transmitting shaft 248 which is journalled in bearings secured to a gear box 241 and an arm holder bracket 212, and a worm 250 also integral with the motion transmission shaft 248 meshes with a worm wheel 251 which is secured to an arm supporting sleeve 218 for transforming the reciprocating motion of the piston 245 into the rotary motion of the arm supporting sleeve. The rotary motion of the arm supporting sleeve is transmitted to the horizontal arm 200 extending therethrough through rollers.

The angular position of the horizontal arm 200 is determined mechanically. More particularly, as shown in FIG. 6, a combined bearing clamp and collar 253 is keyed to the righthand arm supporting sleeve 218 and the periphery of the collar 253 is serrated (254) to be engaged by the serration of a dog 255 secured to collar 253 by means of a bolt 256. A bolt 257 is secured to one end of the dog 255 with the head of the bolt 257 arranged to cooperate with a stop member 258 secured to the arm holder bracket 212. To adjust the angle of rotation of the horizontal arm, the dog 255 is moved to a suitable position of the serration of the collar 253, and then the dog is secured to the collar by means of bolt 256. A fine adjustment of the dog is provided by adjusting bolt 257 which is locked by a lock nut after adjustment.

A direction switching valve 259 for controlling the supply of the pressurized fluid to the fluid pressure actuator 240 for rotating the horizontal arm is mounted on a manifold (not shown) secured to the arm holder 210 and connected to P port 412 and T port 413.

Figure 8:
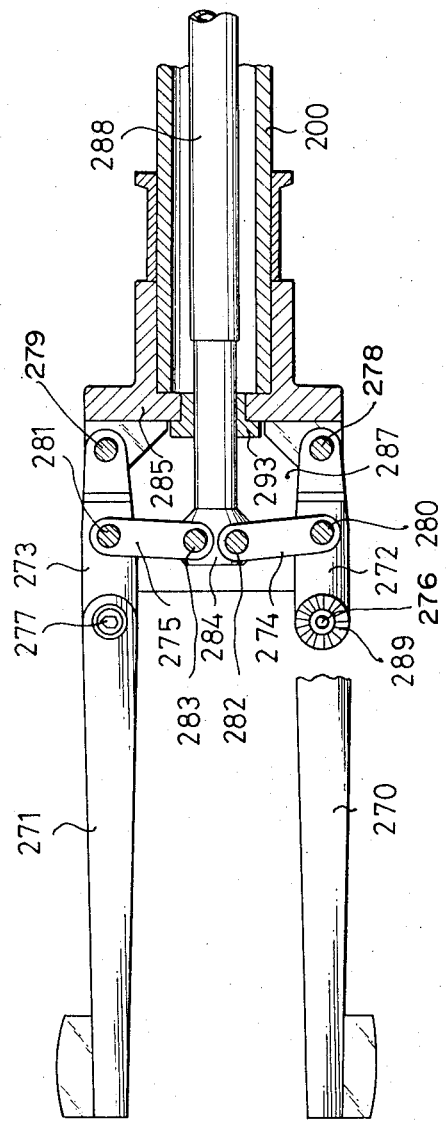
FIG. 8 is an enlarged view, partly in section of the grasping mechanism shown in FIG. 5.

With reference now to FIG. 8, the grasping mechanism will be described hereunder. A pair of fingers 270 and 271 are pivotably connected to finger members 272 and 273 by bolts 276 and 277 respectively, so that the angles between respective fingers and finger members can be adjusted to any desired value. To prevent inadvertent relative movements the mating surfaces of the fingers and the arms are corrugated as at 289. The opposite ends of the finger members 272 and 273 are pivotally connected to gripping member 285 by means of pins 278 and 279. The intermediate points of the finger members 272 and 273 are connected to links 274 and 275 by pins 280 and 281 and the opposite ends of the links 274 and 275 are pivotally connected to a block 284 by means of pins 282 and 283. Accordingly, when the block 284 is reciprocated in the axial direction of the horizontal arm 200, finger members 272 and 273 are rotated about pins 278 and 279. Consequently the fingers are opened and closed. The grip member 285 is secured to one end of the horizontal arm 200 by means of a pin, not shown. A pair of grip brackets 286 and 287 (FIG. 2) secured to grip member 285 function to provide an accurate guide for an assembly comprising the link block 284, links 274 and 275 and finger members 272 and 273, and prevent them from becoming loose.

The link block 284 is threaded on one end of the connecting rod 288 and is fastened thereto by means of a nut (not shown) and this end of the connecting rod 288 extends through a bushing 293 secured to the grip member 285, whereas the opposite end of the connecting rod 288 extends through a bushing 294 (FIG. 5) fitted in hollow shaft 233 connected to the opposite end of the horizontal arm, as that the connecting rod 288 can reciprocate in the horizontal direction. A connecting arm 297 is rotatably mounted on the righthand end of the connecting rod 288, as viewed in FIG. 5, through a bearing. The connecting arm 297 is connected to the piston rod of a fluid pressure actuator 295 for operating the grasping mechanism, the actuator 295 being bolted to a bracket 296 secured to connecting arm 231. A bolt 300 secured to the outer end of connecting arm 297 acts as a stop for the fluid pressure actuator 295 whereby it is possible to adjust the angle between fingers 270 and 271 by adjusting bolt 300. Although not shown in the drawing, the bolt 300 is locked by a lock nut which cooperates with the bracket 296 to determine the stroke of the fluid pressure actuator 295.

A direction switching valve 303 for controlling the supply of the pressurized fluid to the fluid pressure actuator 295 which is used to open and close fingers 270 and 271 is connected to a manifold, not shown, mounted on the arm holder and to P port 412 and T port 413.

It is advantageous to use a rotary valve as shown in FIG. 3 for the purpose of simplifying the pipings between servovalves and direction switching valves associated with respective fluid pressure actuators and the source of the pressurized fluid, the pipings between respective valves and a reservoir of the source, and drain pipings. More particularly, a rotary valve is used to control the flow of the pressurized fluid to various fluid pressure actuators for reciprocating and rotating the horizontal arm and for operating the grasping mechanism which rotate together with the swivel shaft thereby preventing interference and damage to long pipe lines and thus saving the space occupied thereby.

As shown in FIG. 3, the rotary valve comprises a valve member 310 and a valve casing 311, the lower end of valve casing 311 being secured to the flanged upper end of a main tubular shaft 312. The lower end of the main tubular shaft 312 is supported by the main shaft through a bearing (not shown) while the flanged upper end thereof is supported by a seat 313 for mounting the rotary valve through a bearing, not shown, whereby the main tubular shaft 312 can rotate relative to the main shaft. The seat 313 is bolted to the arm holder 210. The valve member 310 is snugly fitted in the valve casing 311 which is bolted to seat 313, so that the valve member 310 can rotate relative to the valve casing 311. Four annular grooves are formed in the peripheral surface of the valve member 310, one of the grooves being communicated with a P port pipe 330 through a conduit 327 extending through the valve member, and said P port pipe 330 being connected to the lower side of the valve member and leading to the source of the pressurized fluid. Another one of the grooves is communicated with a pipe 331 through a conduit 328 in the valve member, the pipe 331 being connected between the bottom of the valve member 310 and the reservoir of the source. The remaining two grooves are connected with each other through the valve member 310 and are used to act as drain grooves to recover the pressurized fluid leaking from above mentioned two grooves and are connected to a drain pipe, not shown, extending between the bottom of the valve member and the reservoir of the source.

The valve casing 311 is provided with ports 324, 325 and 326 at portions corresponding to the grooves in the peripheral surface of the valve member 310. Port 324 is connected to a pipe for feeding the pressurized fluid, port 325 to a return pipe and port 326 to a drain pipe which are connected respectively with pipings for fluid pressure actuators for reciprocating the arm, for rotating the arm and operating the grasping mechanism.

O-rings 315 and 316 are provided to prevent any leakage of the pressurized fluid through a small gap between the valve member 310 and the valve casing 311, O-ring 316 being received in a groove formed in the peripheral surface of the valve member 310 whereas the O-ring 315 in a groove is formed between the valve member 310 and a dust proof cap 314 secured on the top of the rotary valve.

A notch (not shown) is formed on the lower end of the main tubular shaft 312 to receive a projection (not shown) secured to the housing of the main shaft for preventing the tubular shaft from rotating. With this construction, even when the main shaft is swiveled, the main tubular shaft is held stationary so that there is no fear of twisting the pipes contained therein.

Figure 9:
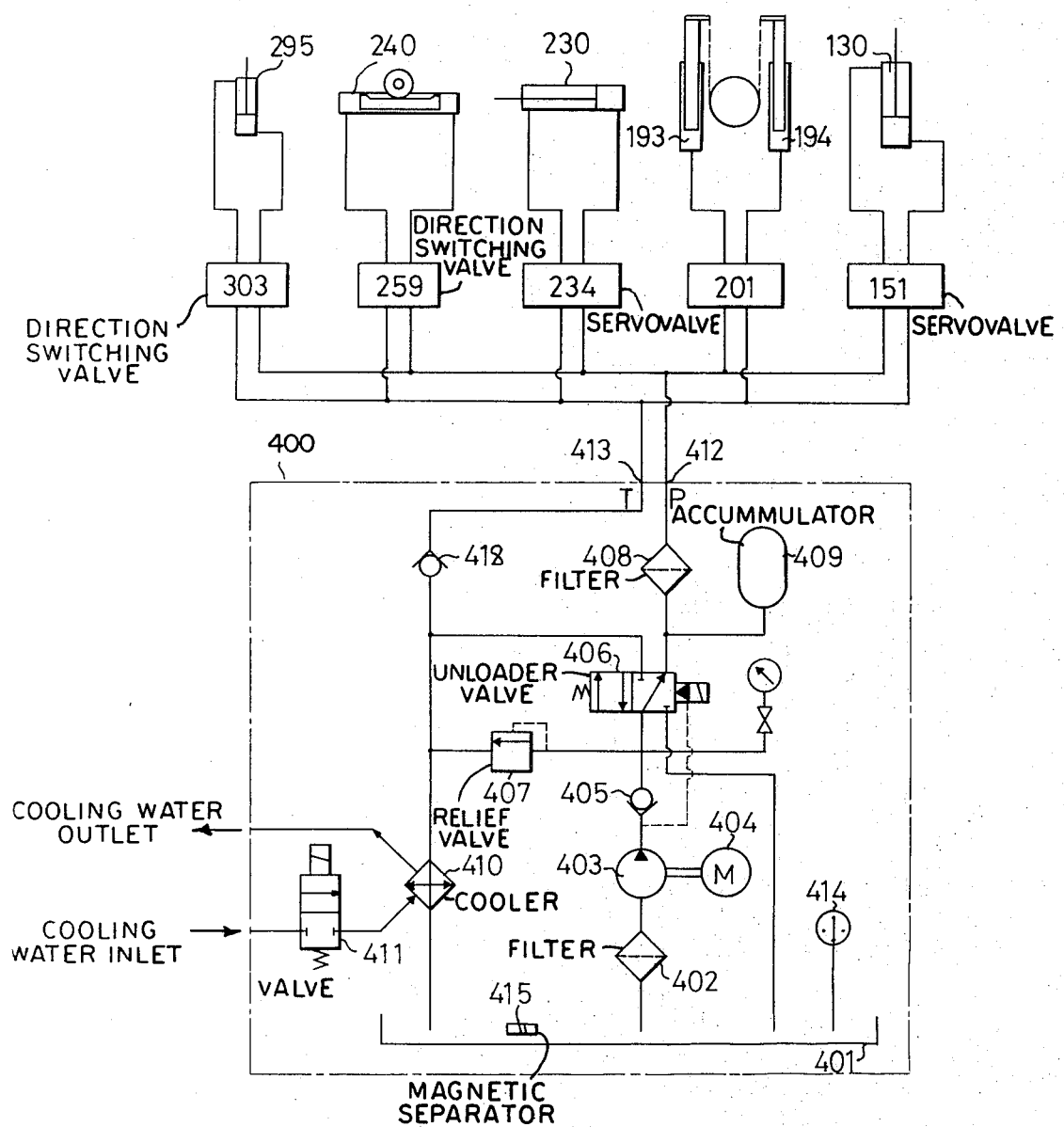
FIG. 9 is a block diagram showing fluid pressure circuits.

With reference now to FIG. 9, the connection of the pipings for the pressurized fluid will be described hereunder.

The operating fluid contained in a reservoir 401 is sucked up and pressurized by a pump 403 driven by an electric motor 404 through a suction filter 402. The pressurized fluid is supplied to an in-line filter 408 through a check valve 405 and an unloading valve 406 and thence supplied to various fluid pressure actuators via P port 412. The return fluid is led to the hydraulic unit 400 via T port 413, being returned to the reservoir 401 through the check valve 418 and a cooler 410. A relief valve 407 is provided for returning pressurized fluid having a pressure above a predetermined valve to the reservoir 401 thereby maintaining a constant pressure of the pressurized fluid. Generally used as an unloading valve 406 is a solenoide-operated two position-four way valve. Accummulater 409 is connected to the output of the pump 403 for absorbing fluctuations in the pressure of the pressurized fluid and for alleviating rapid variation in the pressure of the pressurized fluid. A thermostat 414 is provided to open a stop valve 411 included in the circuit of the cooling water flowing through cooler 410 when the temperature of the operating fluid in the reservoir increases beyond a predetermined value. A magnetic separator 415 is immersed in the reservoir 401 to remove iron dust in the operating fluid. Various component elements marked by dotted and dash lines constitute a pressure unit 400.

The control system of the novel robot machine functions to automatically and efficiently control various members described above according to a prescribed program. Further, the control system performs a point-to-point control. Thus, it performs a series of operations at one point and another series of operations at another point. In addition, a closed loop control system is used for positioning various shafts at correct positions. This control system is characterized in that the desired program can be readily performed by mounting a tape perforated with the sequence of the operations and then operating the knobs for setting the position and time, that the program can be stored since perforated tapes are used, that there is no limit on the number of the steps of the program and that where it is desired to rapidly position a heavy load, it is possible to smoothly start and stop the operations without any shock by providing an automatic adjusting circuit for a DC servo amplifier to be described later.

The construction and operation of the control system is as follows. A program of the word address type using E1A8 unit standard codes is recorded on a tape by perforating and the perforated tape is read by a suitable reader. The control system comprises a feedback control circuit including a DC servo amplifier receiving as its input the voltage generated by a potentiometer which stores the position of the arm and having an output equal to the voltage generated by a potentiometer which detects the position of the arm and an electro-fluid pressure servovalve. This control system can simultaneously control the vertical movement, horizontal movement and swivelling movement of the arm. When combined with the two axis ON, OFF control of the wrist member, the control system provides an extremely flexible control.

To prepare the program, the content of the operations is analyzed, and then the order of the operations is determined. An operation chart is then prepared by writing the direction of movement of the arm, the speed of stroke, the speed of the wrist member, the waiting times at respective steps and transmission and receipt of signals between associated apparatus according to their order. The chart is translated into mechanical terms which are used to prepare a process sheet. The tape is then perforated according to the order of the process sheet and the perforated tape is mounted on a reader. In accordance with the operation chart, the position of the arm is set and stored in the potentiometer.

Figure 10:
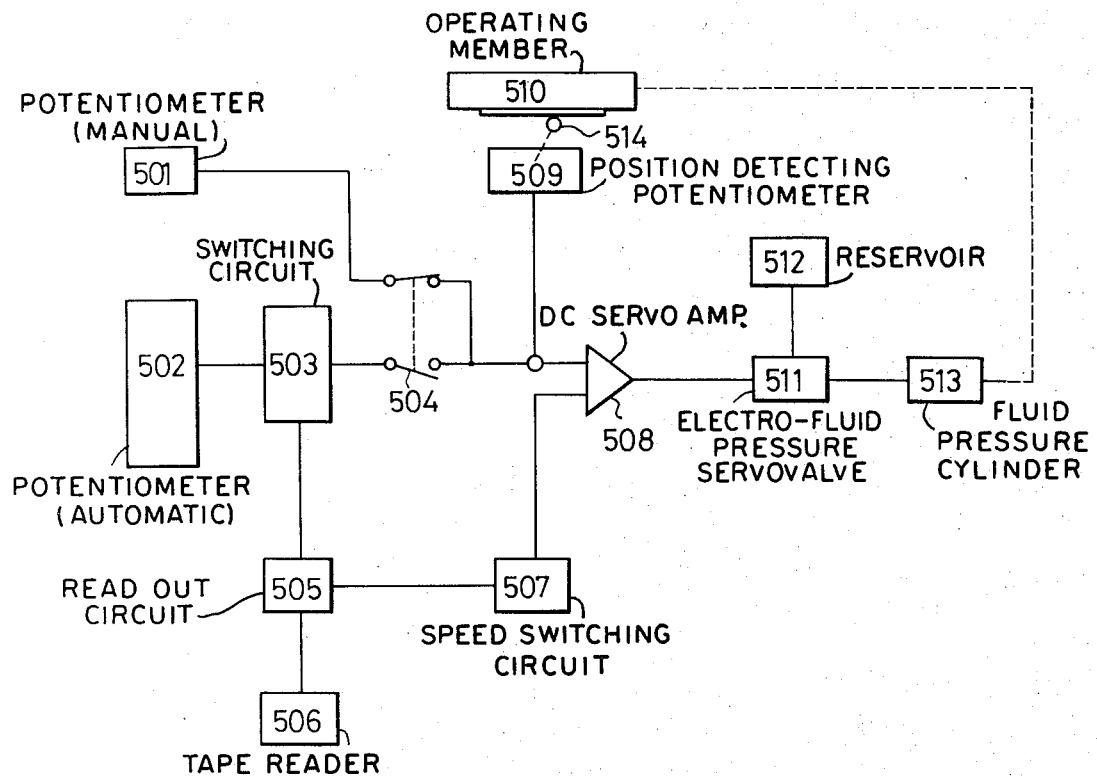
FIG. 10 is a block diagram showing an electrical control system.

The control system outlined hereinabove is shown in detail by the block diagram shown in FIG. 10. In the case of the manual operation, an automatic-manual transfer switch 504 on a control panel is set for the manual operation (lower side), and the perforated tape is mounted on a reader 506. A potentiometer 501 for setting the manual operation position is operated to apply a input voltage to the servosystem. The difference between the voltage generated by the potentiometer 501 and a feedback voltage from a position detecting potentiometer 509 which represents the actual position of the arm is applied to the input of a DC servoamplifier 508. The output from the servoamplifier 508 is applied to an electro-hydraulic servovalve 511 to actuate a hydraulic cylinder 513. This cylinder moves the horizontal arm until said differential voltage disappears. The arm is operated manually to move in the vertical and horizontal directions and to swivel in the horizontal direction in accordance with the sequence described in the process sheet and when the arm is brought to the prescribed position, the dial on the operating knob is read to set the respective knobs of the potentiometers for automatic operation. Thereafter, the position setting knob is rotated until the differential voltage decreases to zero. Then, the position of the arm is set and stored with the potentiometer.

For an automatic operation, the automatic-manual transfer switch 504 on the control panel is switched to the automatic side (upper side) and a program, for example, a vertical shaft $V_1$ is designated. Then, a switching circuit 503 cooperates with readout circuit 505 for applying the output from the position setting potentiometer 502 to the DC servoamplifier 508. Said output is proportional to the angle of rotation of the knob of the potentiometer. Under these conditions, the fact that the position is now being stored in a particular potentiometer is indicated by a lamp on the control panel. The feedback voltage representing the present position of the arm and the differential voltage caused by $V_1$ are applied to the DC servoamplifier 508 as inputs. Although the DC servoamplifier 508 produces an output proportional to the differential voltage, at this time a $V_1$ code is read out concurrently with a speed code so that only a current whose valve has been set by the speed code is applied to the electrohydraulic servovalve 511 as input through a speed switching circuit 507 for moving an operating member 510 to the position $V_1$ at the set speed by means of the hydraulic cylinder 513.

In this manner, various shafts of the apparatus are controlled by a prescribed program and the cycle of operation is automatically repeated. In the drawing, 512 represents the hydraulic reservoir, and 514 represents rack-pinion.

Different from the prior art apparatus which uses a combined guide and post, according to this invention since a pantagraph mechanism is used, it is possible to reduce the size of the apparatus and to increase the efficiency. Further, the use of the spring eliminates the defect of the pantagraph mechanism, thus assuring smooth and accurate operations. This also improves the safeness of operation and saves labour. Although in the above described embodiment the mechanism mounted on the platform is designed to swivel, rotate and reciprocate the arm, and to open and close the fingers of the wrist member, it should be understood that the types of operations are not limited to these operations and that some of them may be omitted or a mechanism performing another operation may be added to the mechanism illustrated.

What is claimed is:

1. Apparatus for handling articles comprising:
a platform,
a handling mechanism mounted on said platform for handling said articles,
a foldable pantagraph for supporting said platform,
means to operate said pantagraph for moving said platform in the vertical direction, and
a spring coupled with said pantagraph operating means to assist the pantagraph operating means while said pantagraph is being operated to raise said platform.
said handling mechanism comprising a vertical shaft rotatably supported by said platform, a horizontal arm supported by said vertical shaft and raised and lowered only by said pantagraph, a wrist member mounted on the end of said horizontal arm, means for rotating said vertical shaft, means for rotating said horizontal arm about the axis thereof, means for reciprocating said horizontal arm and means for operating said wrist member.

2. The apparatus according to claim 1 wherein said foldable pantagraph comprises two pairs of arms, the upper ends of the arms of each pair are pivotally connected to said platform, the lower end of one arm is pivotally connected to a base whereas the lower end of the other arm of the pair is pivotally connected to a slide member slidably mounted on said base and operatively connected to said pantagraph operating means, and the intermediate points of the arms of each pair are interconnected by a pin, thus forming a letter X configuration.

3. The apparatus according to claim 1 wherein said various means for operating said vertical shaft, said horizontal arm and said wrist member and said means for operating said pantagraph comprise discrete hydraulic actuators.

4. The apparatus according to claim 3 which further comprises means for controlling the flow of operating fluid to said respective hydraulic actuators, and electric control means for controlling said flow control means.

5. The apparatus according to claim 1 wherein said flow control means comprises a rotary valve operated by said vertical shaft for distributing the operating fluid among respective hydraulic actuators.

6. The apparatus according to claim 4 wherein said electric control means controls said hydraulic actuators in accordance with a prescribed program.

7. The apparatus according to claim 1 wherein said operating means comprises a hydraulically operated piston cylinder assembly and said spring is disposed in alignment with said piston cylinder assembly so that said spring is compressed by the stroke of the piston.

8. The apparatus according to claim 7 wherein said pantagraph is mounted on a base and said piston cylinder assembly is mounted on said base in parallel with said base.

9. The apparatus according to claim 7, wherein said spring is coupled to the piston of said piston cylinder assembly and is compressed by an outward stroke of the piston relative to the cylinder.

10. The apparatus according to claim 9 wherein said outward stroke of said piston relative to said cylinder operates to fold said pantagraph to lower said platform, the compressed spring assisting the inward stroke of said piston relative to said cylinder in raising the platform.

11. The apparatus according to claim 2 wherein said operating means comprises a hydraulically operated piston cylinder assembly coupled between the lower ends of at least one pair of said arms and said spring is disposed in alignment with said piston cylinder assembly so that said spring is compressed by the outward stroke of said piston relative to said cylinder during folding of said pantagraph during lowering of said platform.

12. The apparatus according to claim 7 wherein said spring assists the output of said piston cylinder assembly from a point of the maximum stroke of the piston relative to the cylinder to an intermediate point of said stroke.

13. The apparatus according to claim 12 wherein said point of the maximum stroke of the piston relative to said cylinder corresponds to the lowermost position of said platform, the spring exerting its largest assisting force at said lowermost position of said platform.

14. The apparatus according to claim 1 wherein said spring is a coil spring which is compressed when said pantagraph is in its lowermost position.

* * * * *